Oct. 1, 1968  W. D. KELLY  3,404,217
MULTICONDUCTOR CABLE AND METHOD OF FORMING THE SAME
Filed Oct. 2, 1967

Inventor:—
William D. Kelly,
By Hofgren, Wegner, Allen,
Stellman & McCord Attys.

United States Patent Office 3,404,217
Patented Oct. 1, 1968

3,404,217
MULTICONDUCTOR CABLE AND METHOD OF
FORMING THE SAME
William D. Kelly, 12 Blodgett St.,
Clarendon Hills, Ill. 60514
Filed Oct. 2, 1967, Ser. No. 672,281
14 Claims. (Cl. 174—103)

ABSTRACT OF THE DISCLOSURE

A multiconductor cable and method of forming the same. The cable comprises a pair of insulated wires retained in spaced association by a conduit which is formed about the respective wires and includes a connecting portion providing facilitated manufacture and defining interlocking means for maintaining the wrapped configuration of the conduit relative to the wires.

---

This invention relates to cables and in particular to multiconductor armored cables and methods of forming the same.

The present invention comprehends an improved method of forming a multiconductor cable wherein a plurality of insulated wires are sheathed in a conduit which is formed about the wires in a new and improved manner to define an improved armored cable structure. In my U.S. Letters Patent No. 3,206,539, I have disclosed and claimed a metal sheathed electrical conductor structure providing substantial advantages over the before known multiconductor cable structures, such as the "BX" cable and the like. The present invention comprehends a new and improved multiconductor cable generally of the type disclosed therein and providing further highly desirable advantages.

More specifically, the present invention comprehends an improved multiconductor cable structure wherein the conduit-forming sheath is in intimate association with the insulated wires, thereby eliminating the need for lining material, such as the combustible paper of the "BX" cable. Further, the cable structure of the present invention is formed by wrapping jacket portions of the sheath about the insulated wires, thereby eliminating the scuffing and possible damage to the insulated wires as may occur where the wires are drawn through a thinwall conduit to provide a multiconductor assembly.

Thus, a principal feature of the invention is the provision of a new and improved method of forming multiconductor cable.

Another feature of the invention is the provision of such a method including the steps of forming a strip of sheet metal to have a generally Z-shaped cross section defined by a first generally flat jacket portion having an inner edge and an outer edge, a second generally flat jacket portion having an inner edge and an outer edge, and a connecting portion extending transversely to the flat jacket portions between the inner edges, disposing first insulated wire in the space defined by the first jacket portion and the connecting portion, disposing a second insulated wire in the space defined by the second jacket portion and the connecting portion, wrapping the first jacket portion about the first wire to dispose the outer edge thereof at the connecting portion, and wrapping the second jacket portion about the second wire to dispose the outer edge thereof at the connecting portion, whereby the wires are retained in spaced parallel side-by-side association with the connecting portion extending transversely to a line between the axes of the wires.

A further feature of the invention is the provision of a new and improved multiconductor cable.

Still another feature of the invention is the provision of such a multiconductor cable including first and second insulated wires, a conduit comprising a sheet metal element having a first jacket portion wrapped about the first wire, a second jacket portion wrapped about the second wire, a generally Z-shaped connecting portion connecting the jacket portions, an outer edge on the first jacket portion mechanically interlocked between one leg and the diagonal of the Z-shaped connecting portion, and an outer edge on the second jacket portion mechanically interlocked between the other leg and the diagonal of the Z-shaped connecting portion.

A yet further feature of the invention is the provision of such a cable and method of forming the same which are extremely simple and economical.

Other features and advantages of the invention will be apparent from the following description taken in connection with the accompanying drawing wherein.

Figure 1:
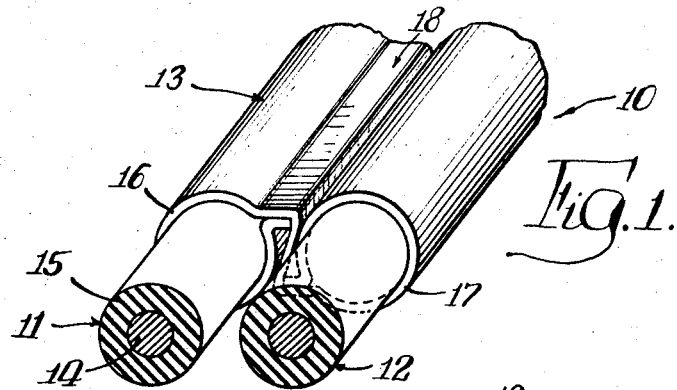
FIGURE 1 is a fragmentary perspective view of a multiconductor cable embodying the invention.

In the exemplary embodiment of the invention as disclosed in the drawing, a multiconductor cable generally designated 10 is shown to comprise a first electrical wire 11 and a second electrical wire 12 retained in spaced side-by-side association by a metal conduit 13. The conduit 13 is formed in situ about the wires 11 and 12 in a new and improved manner to provide a positive retained association of the wires.

Figure 6:
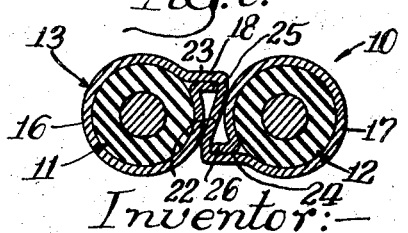
FIGURE 6 is a transverse section thereof as upon completion of the forming of the cable.

More specifically, the wires 1 and 12 may comprise conventional insulated wires including a conductor 14 and surrounding insulation 15. As best seen in FIGURE 6, the conduit 13 includes a first jacket portion 16 wrapped about wire 11 and a second jacket portion 17 wrapped about wire 12. The respective jacket portions are connected by a generally Z-shaped connecting portion 18 to define a compact multiconductor cable 10.

Figure 2:
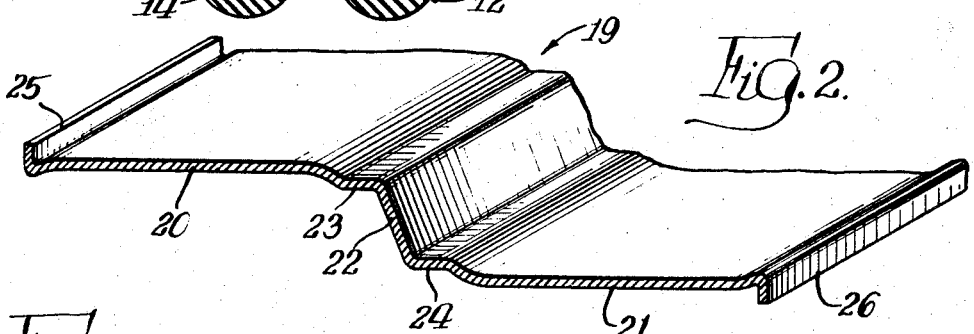
FIGURE 2 is a fragmentary perspective view of the sheathing material as arranged upon completion of a preliminary forming step.

The conduit 13 may be formed from conventional sheet stock, such as metal sheet material and, illustratively herein, comprises aluminum sheet material. As shown in FIGURE 2, the sheet metal may be preliminarily formed to define a generally Z-shaped preform generally designated 19 defined by a first generally flat portion 20, a second generally flat portion 21 extending parallel to and spaced from the plane of the first portion 20, and a portion 22 connecting inner edge 23 of portion 20 to inner edge 24 of portion 21. As shown in FIGURE 2, the edges 23 and 24 may be formed to define flat sections effectively defining with connecting portion 22 a generally Z- shaped configuration. The outer edges 25 and 26 of portions 20 and 21, respectively, may be turned as shown in FIGURE 2 to define flanges extending perpendicular to the flat plane of the sheet portions 20 and 21.

Figure 3:
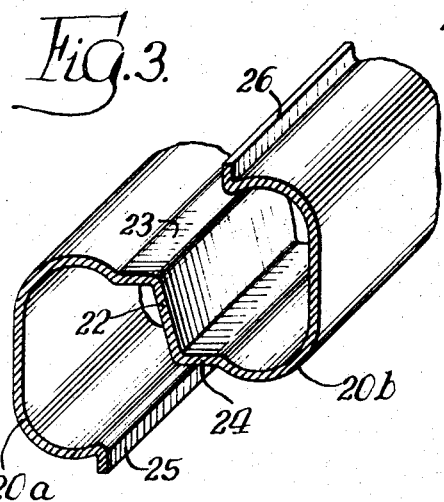
FIGURE 3 is a fragmentary perspective view thereof as arranged upon completion of a further forming step.
Figure 4:
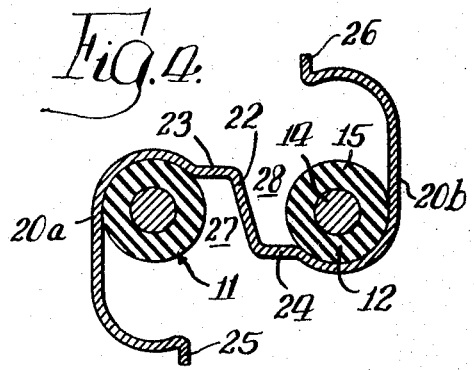
FIGURE 4 is a transverse section thereof with the insulated wires disposed in association therewith.

Referring now to FIGURE 3, the preform 19 is subsequently further suitably formed to cause the portions 20 and 21 to define U-shaped portions 20a and 20b opening generally toward the connecting portion 22 and thusly defining channels in which the wires 11 and 12 may be installed, as shown in FIGURE 4. Thusly, the wires are effectively disposed in the spaces 27 and 28 defined respectively by the jacket portions and the connecting portion of the conduit.

Figure 5:
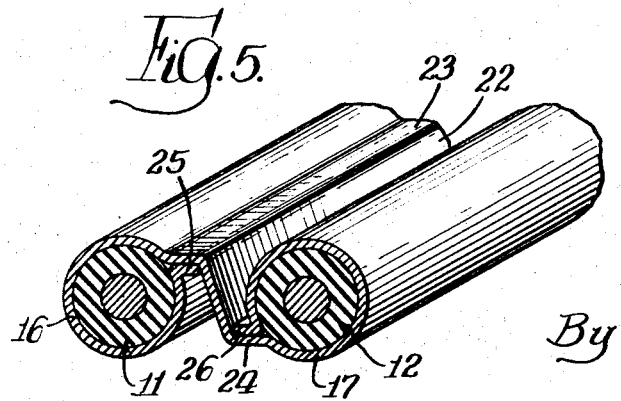
FIGURE 5 is a fragmentary perspective view thereof upon completion of the wrapping step.

The wrapping of the respective wires is continued, as shown in FIGURE 5, to bring the turned edges 25 and 26 of the jacket portions into facial engagement with the flat sections 23 and 24. If desired, the flanges 25 and 26 may be secured to the portions 23 and 24, respectively, as by welding at this time.

Referring now to FIGURE 6, the completion of the forming of the cable 10 is effected by urging the wrapped wires 11 and 12 toward each other to turn the connecting portion 22 about its connection to the edge portions 23 and 24 from the open Z-configuration of FIGURE 5 to the tight Z-configuration of FIGURE 6 wherein the portions 23 and 24 effectively define legs of the Z-configuration overlying flanges 25 and 26 to mechanically interlock the flanges in facial engagement with the portions 23 and 24 and thereby retain the jacket portions 16 and 17 in tight wrapped association with their respective wires 11 and 12. As best seen in FIGURE 6, the connecting portion 22 extends transversely to the line connecting the axes of the wires 11 and 12 in the made-up arrangement of the cable and is brought to a slightly overcentered disposition to define the desired mechanical interlock.

As shown in FIGURE 1, the ends of the wires 11 and 12 may be exposed by terminating the conduit 13 at a desired position lengthwise of the wires. The conduit 13 may be readily removed from the desired portion of the wires to be exposed as by cutting the sheet metal with the Z-connection between the jacket portions being deformable to permit facilitated access by the shears to the conduit between the wires. The forming of the conduit may be effected by conventional sheet metal forming apparatus as is well known to those skilled in the art.

The sheet metal is preferably formed in tight wrapped association with the wires, as shown in FIGURE 5, to eliminate air pockets and the like within the sheath, thereby substantially increasing the life of the wire insulation by precluding access to oxygen and other atmospheric gases tending to deteriorate such insulation. The Z-connection between the jacket portions of the cable permits of limited movement between the wires for facilitated installation of the cable.

The turning of the outer edges in addition to providing means for obtaining the desired interlock further provides the highly desirable advantage of directing the relatively sharp outer edges away from the insulation 15 of the wires, thereby to prevent damage to the wires as occurs in cable structures wherein the insulation material is contacted by such edges. Still further, the turned edges 25 and 26 serve as a reinforcement of the sheet portions 23 and 24 in supporting the two wrapped wires in juxtaposed side-by-side relationship.

While I have shown and described one embodiment of my invention, it is to be understood that it is capable of many modifications. Changes, therefore, in the construction and arrangement may be made without departing from the spirit and scope of the invention as defined in the appended claims.

I claim:

1. The method of forming multiconductor cable comprising the steps of:

forming a strip of sheet metal to have a generally Z-shaped cross section defined by a first jacket portion having an inner edge and an outer edge, a second jacket portion having an inner edge and an outer edge, and a connecting portion extending between said inner edges;

disposing a first insulated wire in the space defined by said first jacket portion and said connecting portion;

disposing a second insulated wire in the space defined by said second jacket portion and said connecting portion;

wrapping said first jacket portion about said first wire to dispose said outer edge thereof at said connecting portion; and wrapping said second jacket portion about said second wire to dispose said outer edge thereof at said connecting portion, whereby said wires are retained in spaced parallel side-by-side association with said connecting portion extending transversely to a line between the axes of the wires.

2. The method of forming multiconductor cable of claim 1 further including the step of securing said outer edges to the metal strip at said connecting portion for positively maintaining the wrapped configuration.

3. The method of forming multiconductor cable of claim 1 further including the step of urging the wrapped wires relatively toward each other to reduce the spacing between the axes thereof subsequent to the wrapping step.

4. The method of forming multiconductor cable of claim 1 wherein the forming step includes forming each jacket portion to define a generally U-shaped configuration opening toward said connecting portion.

5. The method of forming multiconductor cable of claim 1 further including the step of turning the jacket portions at the outer edges thereof to define a securing flange facially engaging the metal strip at said connecting portion upon completion of the wrapping step.

6. The method of forming multiconductor cable of claim 1 further including the step of turning the connecting portion about its connections to said inner edges of the jacket portions to mechanically interlock the outer edges for maintaining the wrapped configuration.

7. The method of forming multiconductor cable of claim 1 wherein said outer edges are facially juxtaposed to said jacket portions adjacent said connecting portion.

8. The method of forming multiconductor cable of claim 1 wherein said outer edges are facially juxtaposed to said jacket portions adjacent said connecting portion, and further including the step of turning the connecting portion about its connections to said inner edges of the jacket portions to mechanically interlock the outer edges for maintaining the wrapped configuration.

9. The method of forming multiconductor cable of claim 1 further including the step of forming said inner edges of the jacket portions to define a generally flat securing portion and turning the outer edges of said jacket portions to define a securing flange facially engaging said securing portion upon completion of the wrapping step.

10. The method of forming multiconductor cable of claim 1 wherein said outer edges are turned to face away from said spaces prior to installation of the wires therein to prevent damage to the wires by engagement of said outer edges therewith.

11. In a multiconductor cable including first and second insulated wires, a conduit comprising: a sheet metal element having a first jacket portion wrapped about said first wire, a second jacket portion wrapped about said second wire, a generally Z-shaped connecting portion connecting said jacket portions, an outer edge on said first jacket portion mechanically interlocked between one leg and the diagonal of said Z-shaped connecting portion, and an outer edge on said second jacket portion mechanically interlocked between the other leg and the diagonal of said Z-shaped connecting portion.

12. The multiconductor cable of claim 11 wherein said outer edges are defined by flat ends of said jacket portions substantially congruent with said legs of the connecting portion in the made-up arrangement of the cable.

13. The multiconductor cable of claim 11 wherein said outer edge of the first jacket portion extends away from said first wire and said outer edge of the second jacket portion extends away from said second wire thereby to preclude contact of the insulated wires by said edges.

14. The multiconductor cable of claim 11 wherein said one leg of the Z-shaped connecting portion extends from the first jacket portion substantially into contact with the second jacket portion and said other leg of the Z-shaped connecting portion extends from said second jacket portion substantially into contact with the first jacket portion.

References Cited

UNITED STATES PATENTS

| 1,840,536 | 1/1932 | Shore | 174—103 X |
| 1,949,077 | 2/1934 | Kalischer | 174—103 |
| 2,043,044 | 6/1936 | Knoderer | 174—103 X |

FOREIGN PATENTS 227,611  10/1910  Germany.

LARAMIE E. ASKIN, *Primary Examiner.*